(12) United States Patent
Shinomiya et al.

(10) Patent No.: US 11,701,971 B2
(45) Date of Patent: Jul. 18, 2023

(54) THREE-PHASE AC MOTOR DRIVE DEVICE, RAIL VEHICLE EQUIPPED WITH SAME, AND THREE-PHASE AC MOTOR DRIVE METHOD

(71) Applicant: Hitachi, Ltd., Tokyo (JP)

(72) Inventors: Takeshi Shinomiya, Tokyo (JP); Naoki Kunihiro, Tokyo (JP); Kazutoshi Ogawa, Tokyo (JP); Katsumi Ishikawa, Tokyo (JP); Kuniaki Otsuka, Tokyo (JP); Hiroyuki Shirata, Tokyo (JP); Tomomi Kanazawa, Tokyo (JP); Takeo Takagi, Tokyo (JP); Shuichi Terakado, Tokyo (JP); Kiyoshi Nakata, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 70 days.

(21) Appl. No.: 17/596,529

(22) PCT Filed: Apr. 10, 2020

(86) PCT No.: PCT/JP2020/016158
§ 371 (c)(1),
(2) Date: Dec. 13, 2021

(87) PCT Pub. No.: WO2020/250561
PCT Pub. Date: Dec. 17, 2020

(65) Prior Publication Data
US 2022/0234450 A1    Jul. 28, 2022

(30) Foreign Application Priority Data
Jun. 14, 2019  (JP) ................. 2019-111338

(51) Int. Cl.
*B60L 9/22*   (2006.01)
*B60L 3/00*   (2019.01)
(Continued)

(52) U.S. Cl.
CPC ............... *B60L 9/22* (2013.01); *B60L 3/003* (2013.01); *H02P 6/10* (2013.01); *H02P 25/16* (2013.01);
(Continued)

(58) Field of Classification Search
CPC ........ B60L 9/22; B60L 3/003; B60L 2200/26; B60L 2210/40; H02P 6/10; H02P 25/16; H02P 27/06
See application file for complete search history.

(56) References Cited

U.S. PATENT DOCUMENTS

| | | | |
|---|---|---|---|
| 8,688,301 B2 | 4/2014 | Kitanaka | |
| 2010/0079093 A1* | 4/2010 | Kitanaka | B60L 3/04 318/400.3 |

(Continued)

FOREIGN PATENT DOCUMENTS

| | | |
|---|---|---|
| JP | 2007-318968 A | 12/2007 |
| JP | 2007-318969 A | 12/2007 |

(Continued)

OTHER PUBLICATIONS

International Search Report (PCT/ISA/210) issued in PCT Application No. PCT/JP2020/016158 dated Jun. 23, 2020 with English translation (five (5) pages).

(Continued)

*Primary Examiner* — Zoheb S Imtiaz
(74) *Attorney, Agent, or Firm* — Crowell & Moring LLP

(57) ABSTRACT

This three-phase AC motor drive device is provided with: a load; an inverter device 1 for driving the load; an MCOK_A_4 connected between the inverter device 1 and the load and electrically connecting or disconnecting the inverter device 1 to or from the load; a voltage detector 21*a* having terminals respectively connected to the circuits of at least two phases to detect the voltages between the three phases; and a current detector 11 for detecting the currents of the three phases. In the connection from the inverter device 1 to the load, the inverter device 1, the MCOK_A_4, the voltage detector 21*a*, the current detector 11, and the load are aligned in this order.

11 Claims, 10 Drawing Sheets

(51) Int. Cl.
*H02P 6/10* (2006.01)
*H02P 25/16* (2006.01)
*H02P 27/06* (2006.01)

(52) U.S. Cl.
CPC ........... *H02P 27/06* (2013.01); *B60L 2200/26* (2013.01); *B60L 2210/40* (2013.01)

(56) References Cited

U.S. PATENT DOCUMENTS

| | | | |
|---|---|---|---|
| 2014/0247003 A1* | 9/2014 | Yamasaki | B60L 15/025 318/802 |
| 2022/0224276 A1* | 7/2022 | Lee | H02P 29/028 |

FOREIGN PATENT DOCUMENTS

| | | | |
|---|---|---|---|
| JP | 2011-78254 A | 4/2011 |
| JP | 2013-192300 A | 9/2013 |
| JP | 2016-178735 A | 10/2016 |

OTHER PUBLICATIONS

Japanese-language Written Opinion (PCT/ISA/237) issued in PCT Application No. PCT/JP2020/016158 dated Jun. 23, 2020 (four (4) pages).

Hindi-language Office Action issued in Indian Application No. 202117058000 dated Jul. 22, 2022 with English translation (six (6) pages).

* cited by examiner

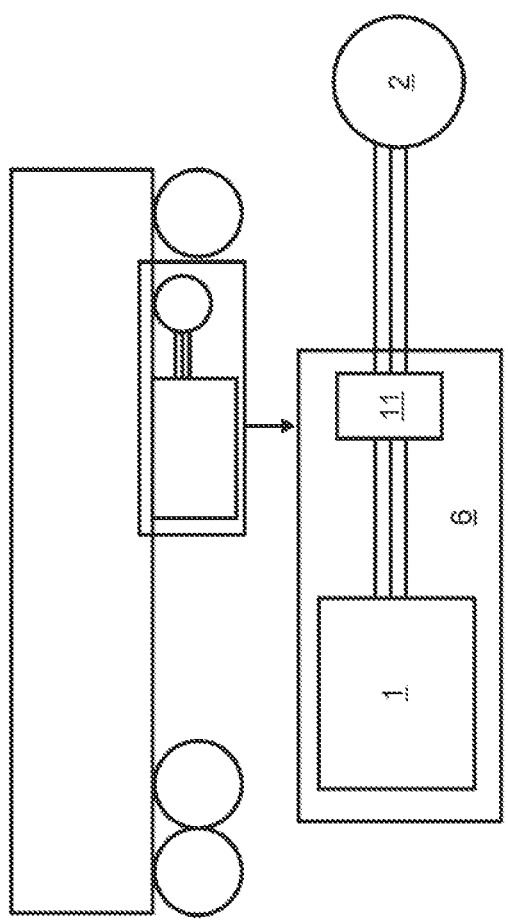
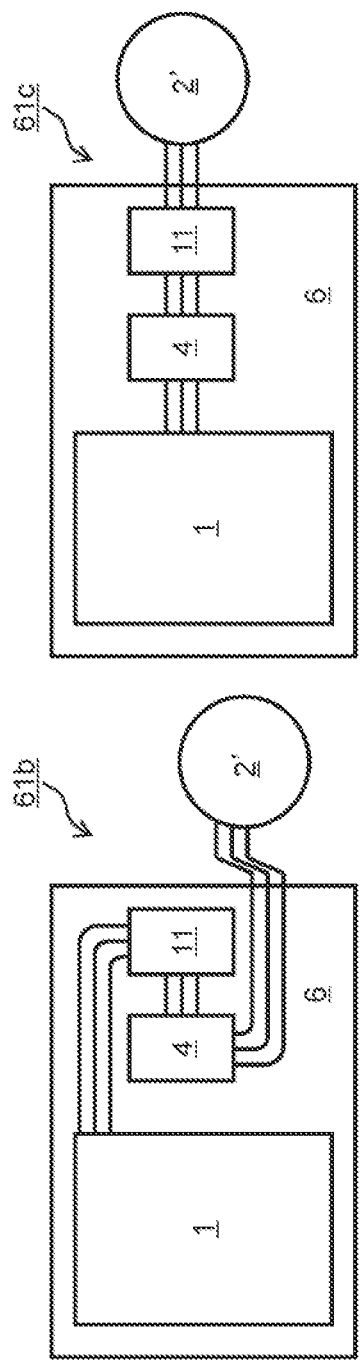

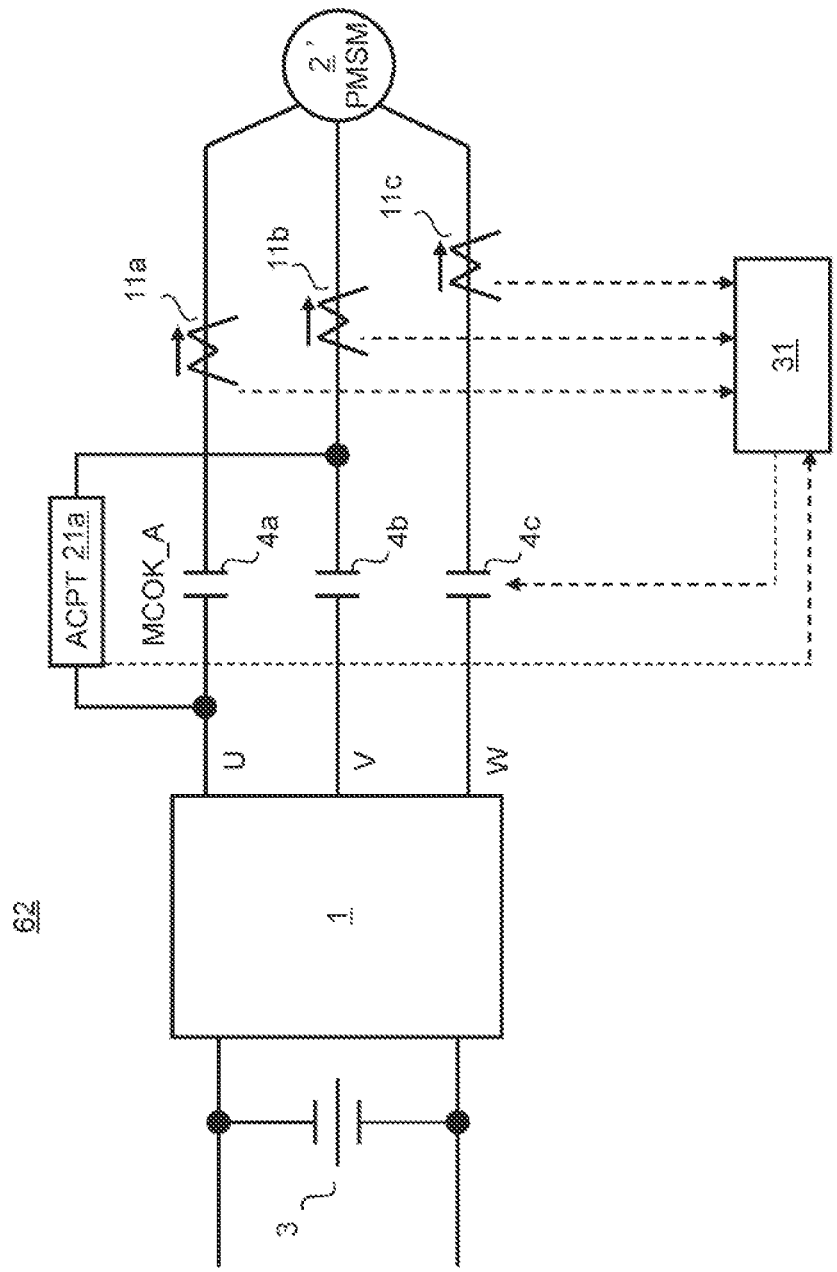

THREE-PHASE AC MOTOR DRIVE DEVICE, RAIL VEHICLE EQUIPPED WITH SAME, AND THREE-PHASE AC MOTOR DRIVE METHOD

TECHNICAL FIELD

The present invention relates to a three-phase AC motor drive device, a rail vehicle equipped with the same, and a three-phase AC motor drive method.

BACKGROUND ART

For a drive device for driving a motor for a rail vehicle, a three-phase AC motor is widely used. In recent years, the application of a permanent magnet synchronous motor (hereinafter abbreviated as "PMSM" in some cases) as a three-phase AC motor has been promoted for the purpose of downsizing a drive system for a rail vehicle and improving the efficiency of the drive system.

When the PMSM rotates, an induced voltage occurs between terminals of the motor due to a magnetic flux of a permanent magnet. Therefore, when a rail vehicle is continuously operated in a state in which a short circuit failure or the like occurs in an inverter device for driving the PMSM, a short circuit current continuously flows in the inverter device due to the induced voltage of the PMSM and a braking force occurs in the PMSM.

When one inverter device is in such a state, acceleration performance of the rail vehicle may decrease and the short circuit accident current may continuously flow to cause burnout of a device or the like. Therefore, a failure of one inverter device prevents the rail vehicle from being normally operated. In the drive device for driving the PMSM, motor cutout contacts (hereinafter abbreviated as "MCOKs") for electrically disconnecting the PMSM from the inverter device at the time of a failure of the inverter device may be provided.

In addition, an inverter device for driving a three-phase AC motor such as a PMSM inputs, to a control device, phase current information of a current detector that detects phase currents of three phases and inter-line voltage information of a voltage detector that detects a voltage between the three phases. The phase current information and the inter-line voltage information are used for control calculation for driving the three-phase AC motor by the inverter device and are used for protective detection to stop the inverter device or the like so as to ensure safety and prevent a failure of the device. As an example of this configuration, Patent Literature 1 and Patent Literature 2 disclose examples of circuit configurations for disconnecting a PMSM from an inverter device at the time of a failure of the device. Techniques relating to them are described at the end as Comparative Example 1 illustrated in FIG. 9 and Comparative Example 2 illustrated in FIG. 10.

CITATION LIST

Patent Literature

Patent Literature 1: Japanese Patent Application Laid-Open No. 2011-78254
Patent Literature 2: Japanese Patent Application Laid-Open No. 2013-192300

SUMMARY OF INVENTION

Technical Problem

The circuit configurations described in Patent Literature 1 and Patent Literature 2 have, for example, the following two problems.

First, when a short circuit failure occurs in a voltage detector (alternating current potential transformer: hereinafter abbreviated as "ACPT" in some cases) between phases, and a motor cutout contactor (MCOK) is in a released state (that is, an opened state), there is a problem that a current detector cannot detect an inter-phase short circuit current of the voltage detector. On the other hand, even when an inverter device and a motor, particularly a PMSM, are disconnected from each other, there is a demand for an ammeter attached or built on the inverter device side to detect a regenerative current generated by the motor.

Second, for a rail vehicle, the inverter device is installed under a floor of the vehicle in many cases. In such a case, there is a problem that it is desirable that the current detector and the ACPT be installed on the rear side (that is, at a position close to the motor) with respect to the MCOK as viewed from the inverter device. There are the following two reasons, for example. One is that the current detector and the ACPT may not be able to be installed in the inverter device due to a dimensional limit on a drive device such as the inverter device. The other one is that it is desirable that the current detector and the ACPT be installed on the rear side of the MCOK in a case in which the MCOK is retrofitted in the inverter device or the like from the perspective of the installation position of the current detector in the existing inverter device.

The foregoing problems may occur even when, for example, compatibility of a drive system using an induction motor as a three-phase AC motor with a drive system using a PMSM is ensured to save labor and achieve simplification. For actual rail vehicles, replacement of existing induction motors with PMSMs is sequentially promoted.

Solution to Problems

To solve the foregoing problems, according to the present invention, a three-phase AC motor drive device that drives a load includes an inverter device that includes a plurality of current controllers each having a combination of a current control element configured to conduct or block a current flowing toward one direction and a rectifying element connected to the current control element in parallel and configured to conduct a current flowing toward, and is configured to convert direct-current power supplied from a power supply into three-phase alternating-current power and drive the load; a motor cutout contact configured to electrically connect or disconnect the inverter device to or from the load; a voltage detector configured to detect a voltage between three phases and having terminals connected to circuits of at least two of the phases; and a current detector configured to detect phase currents of the three phases. In a connection from the inverter device to the load, the inverter device, the motor cutout contact, the voltage detector, the current detector, and the load are arranged in this order.

Advantageous Effects of Invention

In the phase-three AC motor drive device according to the present invention, when a short circuit failure occurs in the voltage detector, the motor cutout contact is released.

Releasing the motor cutout contact electrically disconnects the inverter device from the AC motor. Even in this state, the current detector can detect a short circuit current flowing in a path between the load and the voltage detector.

The case in which the motor cutout contact is released corresponds to a case in which the load of the three-phase AC motor drive device used in a rail vehicle is a permanent magnet synchronous motor and a failure such as a short circuit failure of the voltage detector or a reduction in output of the inverter device occurs. In such a case, a driver or the like may take optimal security measures to eliminate a regenerative braking action of the permanent magnet synchronous motor and continuously operate the vehicle with other remaining power.

In addition, when the load is changed from an induction motor to a permanent magnet synchronous motor, basic design may be made such that the motor cutout contact required to avoid a regenerative braking action caused at the time of the foregoing failure, and the voltage detector are disposed in the immediate vicinity of the inverter device in this order. To secure a space for the motor cutout contact, the current detector is disposed in the immediate vicinity of the load while avoiding the space. In other words, even in a case in which the motor cutout contact is not required in the inverter device at the initial design stage, when the space is secured, and the motor cutout contact needs to be retrofitted, there is no trouble. That is, it is easy to secure the installation configuration of the inverter device and compatibility of device arrangement, regardless of whether the motor cutout contact is present.

BRIEF DESCRIPTION OF DRAWINGS

FIG. 4A is a configuration diagram illustrating a first comparative example of arrangement of an inverter unit.

FIG. 4B is a configuration diagram illustrating a second comparative example (comparative device 61b) of the arrangement of the inverter unit.

FIG. 4C is a configuration diagram illustrating arrangement of an inverter unit (present device 61c) according to Example 1.

FIG. 5 is a configuration diagram of a present device according to Example 2.

DESCRIPTION OF EMBODIMENT

As an embodiment of the present invention, Example 1 is described below with reference to drawings. A three-phase AC motor drive device according to the embodiment of the present invention is abbreviated as a present device, while a three-phase AC motor drive device according to a comparative example is abbreviated as a comparative device.

Example 1

Figure 1:
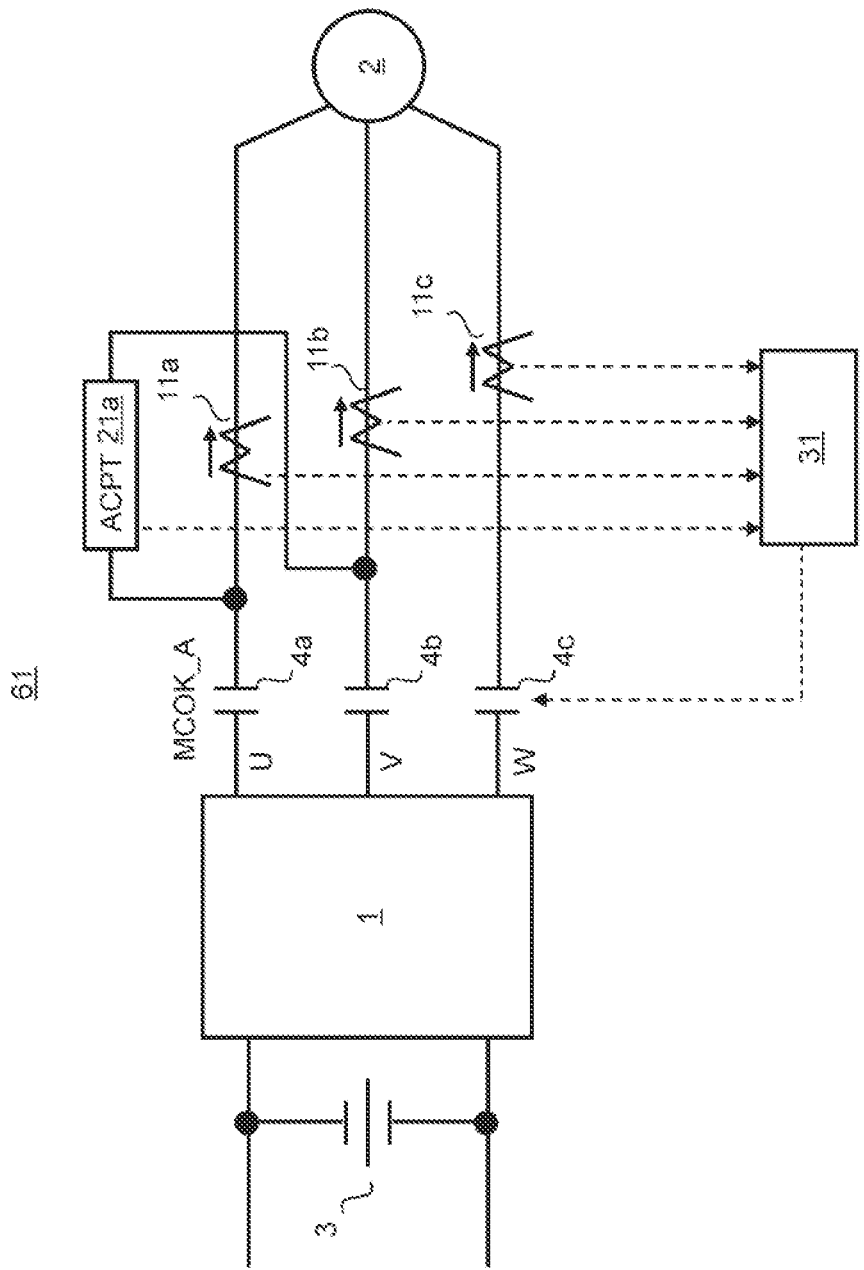
FIG. 1 is a configuration diagram illustrating an example of a three-phase AC motor drive device (present device) according to an embodiment of the present invention.

FIG. 1 is a configuration diagram illustrating an example of a present device 61 according to Example 1. An inverter device 1 is constituted by a current control element that can conduct or block a current flowing from a high-pressure side to a low-pressure side, and a diode that can conduct a current flowing toward a direction opposite to the one direction.

As the current control element, a power semiconductor element such as an insulated gate bipolar transistor (IGBT) or a power metal oxide semiconductor field effect transistor (MOSFET) is used in general.

Silicon is used as a material of these power semiconductor elements in many cases. However, in recent years, power semiconductor elements in which SiC (silicon carbide) or GaN (gallium nitride) is used have been increasing in number to contribute to reductions in system losses. Therefore, SiC or GaN may be used in the current control element used in the inverter device 1 according to the present invention.

The inverter device 1 converts direct-current power output from a direct-current power supply not illustrated into three-phase alternating-current power and drives an AC motor 2. The direct-current power supply that inputs power to the inverter device 1 is a direct-current power supply input unit for the inverter device. A smoothing capacitor 3 is connected to the inverter device 1 in parallel. The inverter device 1 is connected to the higher-level direct-current power supply via the smoothing capacitor 3. The AC motor 2 is described as a load in some cases.

As the AC motor 2, an induction motor, a PMSM_2', or the like is used. Although FIG. 1 illustrates that the inverter device 1 is configured to drive the single AC motor 2, the inverter device 1 may be configured to drive a plurality of AC motors 2. In some drawings, the PMSM_2' is indicated by a reference sign 2' to distinguish them.

ACPTs_11a to 11c that detect current values of phases and MCOKs_A_4a to 4c are provided on the alternating-current output side of the inverter device 1. The MCOKs_A_4a to 4c are collectively referred to as MCOKs_A_4, while the ACPTs_11a to 11c are collectively referred to as ACPTs_11. A control device 31 acquires detection output of the ACPTs_11 and controls a switching operation of each current control element of the inverter device 1 based on the detection output such that the AC motor 2 outputs desired torque.

When current values detected by the ACPTs_11 are abnormally high or the like, the inverter device 1 may be stopped or the MCOKs_A_4 may be released to electrically disconnect the inverter device 1 from the AC motor 2 for device protection and safety.

In accordance with a release instruction output from the control device 31, the MCOKs_A_4 connect or disconnect main circuit contacts that electrically connect the three phases of the inverter device 1 and the AC motor 2. A configuration for turning on and releasing for each phase or a configuration for turning on and releasing in coordination with the plurality of phases may be provided.

In addition, the ACPTs_11 may be only the two ACPTs_11a and 11c disposed in two of the phases, for example. That is, it is not necessary to detect currents of all the three phases. A configuration for detecting currents in two of the three phases and calculating a current of the remaining one phase while assuming that three-phase currents are in equilibrium may be provided.

An ACPT_21a is provided between phases (U and V phases in the example of FIG. 1) on the alternating-current output side of the inverter device 1 and on the AC motor 2 side and detects a voltage between the phases, that is, a voltage between terminals of the AC motor. When the control device 31 or the like acquires a detection signal of the ACPT_21a and the AC motor 2 is the PMSM_2' or the like, the control device 31 or the like controls output of the inverter device 1 after confirming the voltage between the terminals, thereby being able to start an operation as an inverter in a stable manner.

In this case, the inverter device 1, the AC motor 2, the MCOKs_A_4, the current detectors 11, and the ACPT_21a are connected in the order of the inverter device 1, the MCOKs_A_4, the ACPT_21a, the current detectors 11a to 11c, and the AC motor 2.

The present device 61 has the foregoing connection configuration. Therefore, even when the MCOKs_A_4 are released to disconnect the inverter device 1 from the AC motor 2, and the ACPT_21a has a short circuit failure (short circuit between the U phase and the V phase in FIG. 1), the current detectors 11a and 11b can detect a short circuit current flowing in a path extending from the AC motor 2 to the ACPT_21a.

In addition, even when not only the short circuit failure of the ACPT_21a occurs but also a short circuit occurs between phases due to burnout of the AC motor 2 or a wiring coil or insulation deterioration in the present device 61, a driver or the like can detect the short circuits. The present device 61 is, for example, suitable to be used as a drive device for a rail vehicle or the like. In the case of the use, when such a short circuit current is detected, and all the MCOKs_A_4 are released, information indicating that the short circuit current flows can be given to a higher-level device such as a vehicle cab. When the information is given to the vehicle cab, the driver or the like can take security measures based on the information. Specifically, it is also possible to stop operating a corresponding vehicle and prevent a device failure from spreading.

Figure 2:
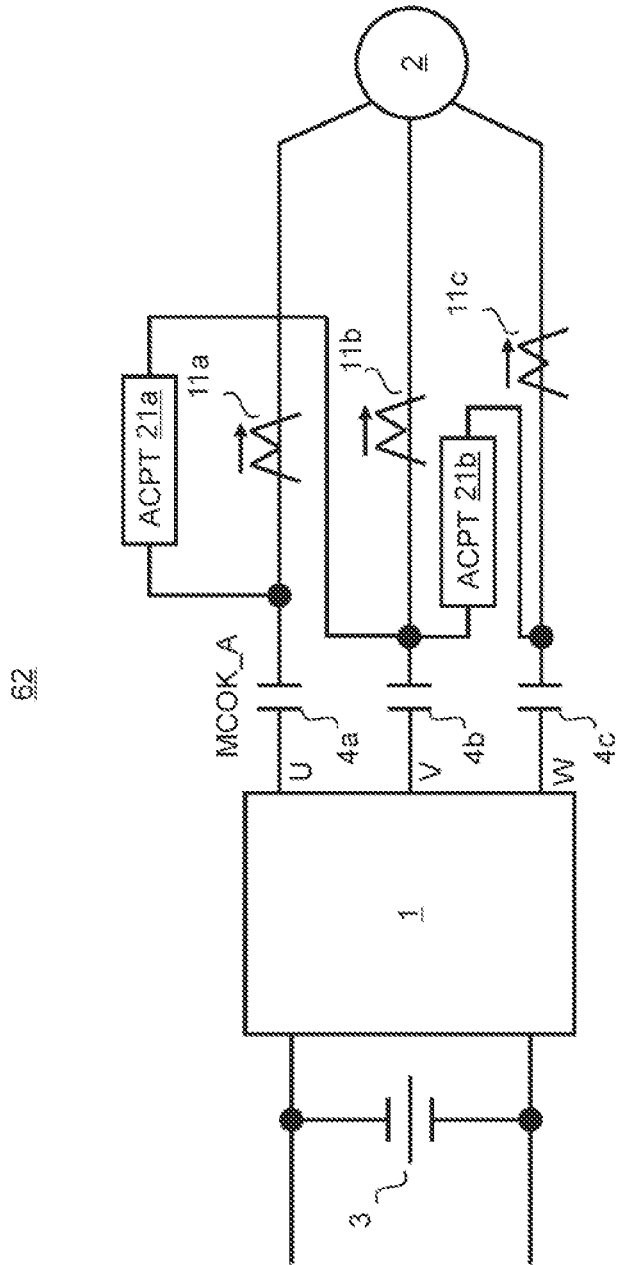
FIG. 2 is a configuration diagram illustrating a modification of a connection form of a voltage detector.

FIG. 2 is a configuration diagram illustrating a present device 62 according to a modification in which the connection form of the ACPT_21a is different from the present device 61 illustrated in FIG. 1. FIG. 1 illustrates the example in which the ACPT_21a is connected at a single position between the U phase and the V phase. However, as illustrated in FIG. 2 (not illustrating the control device 31), a configuration in which the voltage detector (ACPT_21a) is connected between the U phase and the V phase and a voltage detector (ACPT_21b) is connected between the V phase and the W phase, that is, a configuration in which voltage detectors are connected at two or more positions between the phases, may be provided.

Figure 3A:
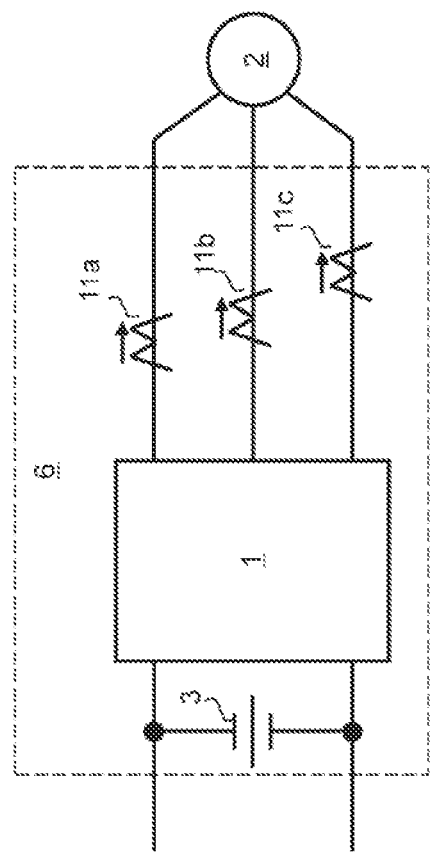
FIG. 3A is a configuration diagram illustrating an example of a configuration of an inverter unit.
Figure 3B:
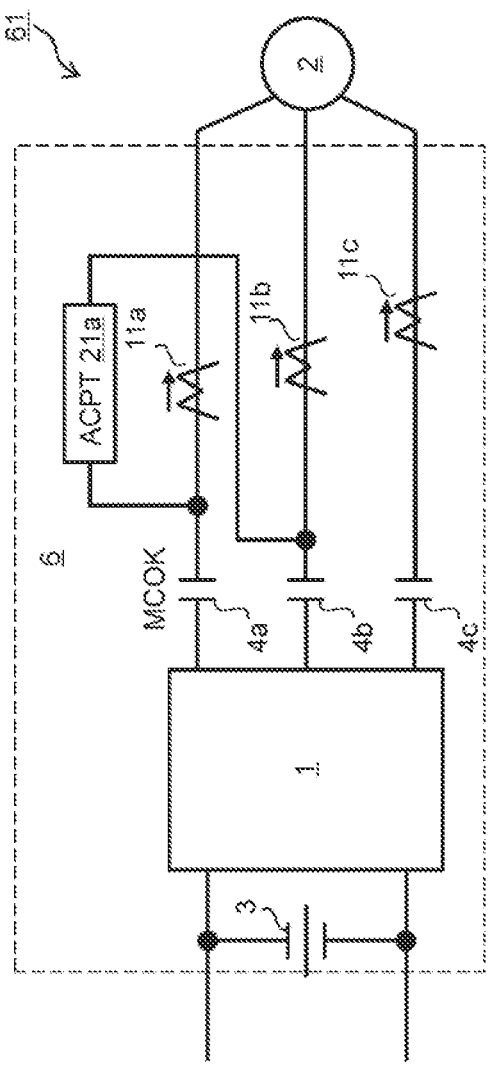
FIG. 3B is a configuration diagram illustrating another example of the configuration of the inverter unit.

FIG. 3 are configuration diagrams exemplifying different inverter units 6 to explain the present device 61 according to Example 1. FIG. 3(a) illustrates that only the current detectors 11 are interposed (connected) in the phases, while FIG. 3(b) illustrates that the current detectors 11 and the MCOKs are interposed in the phases and the ACPT_21a is disposed between the phases. In addition, FIG. 3(a) illustrates an example of a unit configuration of a general drive device for a rail vehicle, and the smoothing capacitor 3, the inverter device 1, and the current detectors 11 are disposed in the inverter unit 6 by a housing or the like. Since a three-phase induction motor is used as the AC motor 2 in a conventional drive device for a rail vehicle, the inverter unit 6 is constituted mainly in a portion surrounded by a dotted-line frame illustrated in FIG. 3(a). Note that "interposed" indicates "connected to a circuit".

In recent years, there has been a rail vehicle in which the PMSM_2' is used as the AC motor 2 to downsize the foregoing drive system and improve the efficiency of the drive system. In this case, as illustrated in FIG. 3(b), the smoothing capacitor 3, the inverter device 1, the current detector 11c, and the ACPT_21a are provided in the inverter unit 6.

In particular, while the dimensions and shape of the housing for the inverter unit 6 are maintained and compatibility with a vehicle using an induction motor as a conventional AC motor 2 is maintained, the AC motor 2 may be replaced with the PMSM_2'. For example, to update the drive device for the rail vehicle or the like, an additional MCOK_A_4 and an additional ACPT_21a are provided as built-in devices in the inverter unit 6. In this case, the following problem with installation occurs.

FIG. 4 are schematic diagrams of the arrangement of inverter units in rail vehicles. FIG. 4(a) illustrates a comparative example, FIG. 4(b) illustrates a comparative device 61b obtained by adding an MCOK to (a), and FIG. 4(c) illustrates installation simplified with the present device 61 illustrated in FIGS. 1, 2, and 3(b). FIG. 4(a) illustrates an example of an overview of installation of the inverter unit 6 in the rail vehicle and illustrates an example of the arrangement of devices in the conventional inverter unit 6.

As illustrated in a lower part of FIG. 4(a), in the conventional rail vehicle, a current detector 11 may be arranged near a terminal for external output in the inverter unit 6 due to a limit on a device implementation space within the inverter unit 6. As described above, when the AC motor 2 is replaced with the PMSM_2', an additional MCOK_4 and an additional current detector 21a are provided. In this case, when the order in which devices are connected is the same as the conventional order illustrated in FIG. 10, the devices are connected in the order of the inverter device 1, the current detectors 11, and the MCOKs_4. As a result, as indicated by the comparative device 61b illustrated in FIG. 4(b), the installation within the inverter unit 6 becomes complex.

On the other hand, when the inverter device 1, the MCOKs_4, and the current detectors 11 are connected in this order, like the present device 61 according to Example 1 illustrated in FIG. 1, the installation within the inverter unit 6 can be simplified as indicated with the present device 61c illustrated in FIG. 4(c). Therefore, it is possible to simplify the replacement of the AC motor 2 with the PMSM_2' while the dimensions and shape of the housing for the inverter unit 6 and compatibility with a vehicle using an induction motor as a conventional AC motor 2 are maintained, and an effect of saving labor is exhibited.

Example 2

Next, Example 2 according to the present invention is described with reference to FIG. 5. FIG. 5 is a configuration diagram of a present device 62 according to Example 2. The present device 62 according to Example 2 illustrated in FIG. 5 is different from the present device 61 according to Example 1 in that one connection terminal of the ACPT_21a is connected between the inverter device 1 and the MCOK_A-4a in a U phase circuit.

With this configuration, the present device 62 according to Example 2 illustrated in FIG. 5 can block the foregoing short circuit current. Regarding this, even in a configuration in which a single MCOK_A is interposed in each phase in the present device 62, when the ACPT_21*a* has a short circuit failure, a short circuit current flows between the ACPT_21*a* and the AC motor 2. The short circuit current is detected by the current detectors 11*a* and 11*b* and input to the control device 31.

When the short circuit current is input to the control device 31, for example, a driver can manually take security measures at an electric vehicle cab or the control device 31 can automatically take security measures. That is, when this short circuit current is equal to or larger than a predetermined current value, the control device 31 outputs a release instruction to the MCOKs_A_4*a* to 4*c* (particularly, 4*a* and 4*b* in the case of FIG. 5). Therefore, the MCOKs_A_4*a* to 4*c* (particularly, 4*a* and 4*b* in the case of FIG. 5) can be released to block the short circuit current.

FIG. 5 only illustrates the example of the configuration of the present device 62. That is, the one connection point (terminal) of the voltage detector 21 is connected between the inverter device 1 and the MCOK_A_4 in the U phase circuit. In addition, the other connection terminal (terminal) of the ACPT_21*a* is connected between the MCOK_4_4*b* and the current detector 11*b* in a V phase circuit.

In the example of the configuration, the connection relationship between the U phase and the V phase may be reversed. That is, one connection point of the ACPT_21*a* connected to two of the three phases may be connected between the inverter device 1 and the MCOK_A and the other connection point may be connected to the MCOK_A and the current detector.

Example 3

Figure 6:
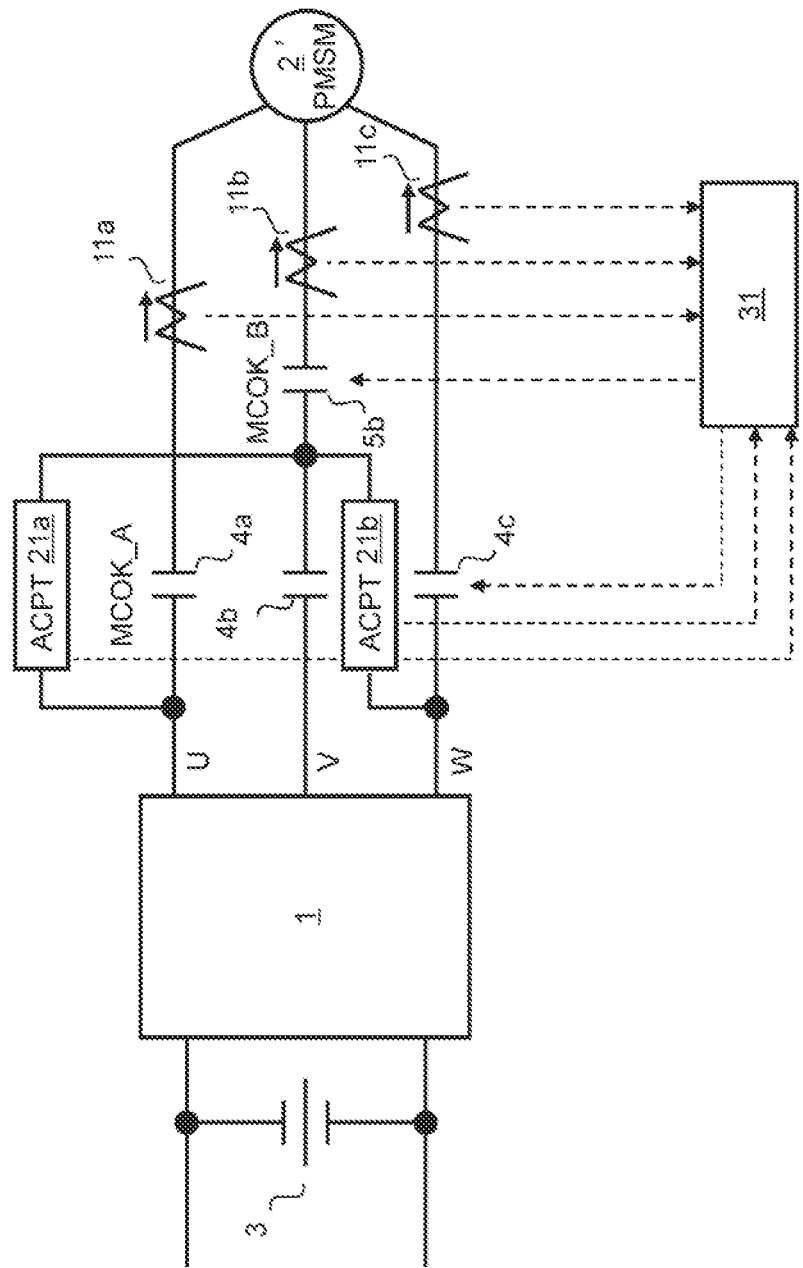
FIG. 6 is a configuration diagram of a present device according to Example 3.

Next, Example 3 of the present invention is described with reference to FIG. 6. FIG. 6 is a configuration diagram of a present device 63 according to Example 2. The present device 63 according to Example 3 illustrated in FIG. 6 is different from the present device 62 according to Example 2 illustrated in FIG. 5 in that a first MCOK_A_4*b* and a second MCOK_B_5*b* are provided to form a series two-stage switch only in the V phase.

The second MCOK_B_5*b* is interposed between a connection point of the ACPT_21*a* and the current detector 11*b*. That is, the second MCOK_B_5*b* is connected such that the connection point of the ACPT_21*a* on the V phase side matches a connection point between the first MCOK_A_4*b* and the second MCOK_B_5*b*.

In the example, the voltage detector 21*b* is disposed between the V phase and the W phase in the present device 63 according to Example 3 illustrated in FIG. 6. In the present device 63, the voltage detector 21*b* is connected such that a connection point of the voltage detector 21*b* on the V phase side matches the connection point between the first MCOK_A_4*b* and the second MCOK_B_5*b*.

The present device 63 can block a ground fault circuit (that is, a ground fault current). In the present device 63, for example, when the ACPT_21*a* has a ground fault on the side on which the ACPT_21*a* is connected to the V phase, the current detector 11*b* detects a ground fault current and inputs the ground fault current to the control device 31.

When the ground fault current detected by the control device 31 is equal to or larger than a predetermined value, the control device 31 outputs a release instruction to the second MCOK_B_5*b*. Therefore, the second MCOK_B_5*b* is released to block the ground fault circuit (that is, the ground fault current).

Example 4

Figure 7:
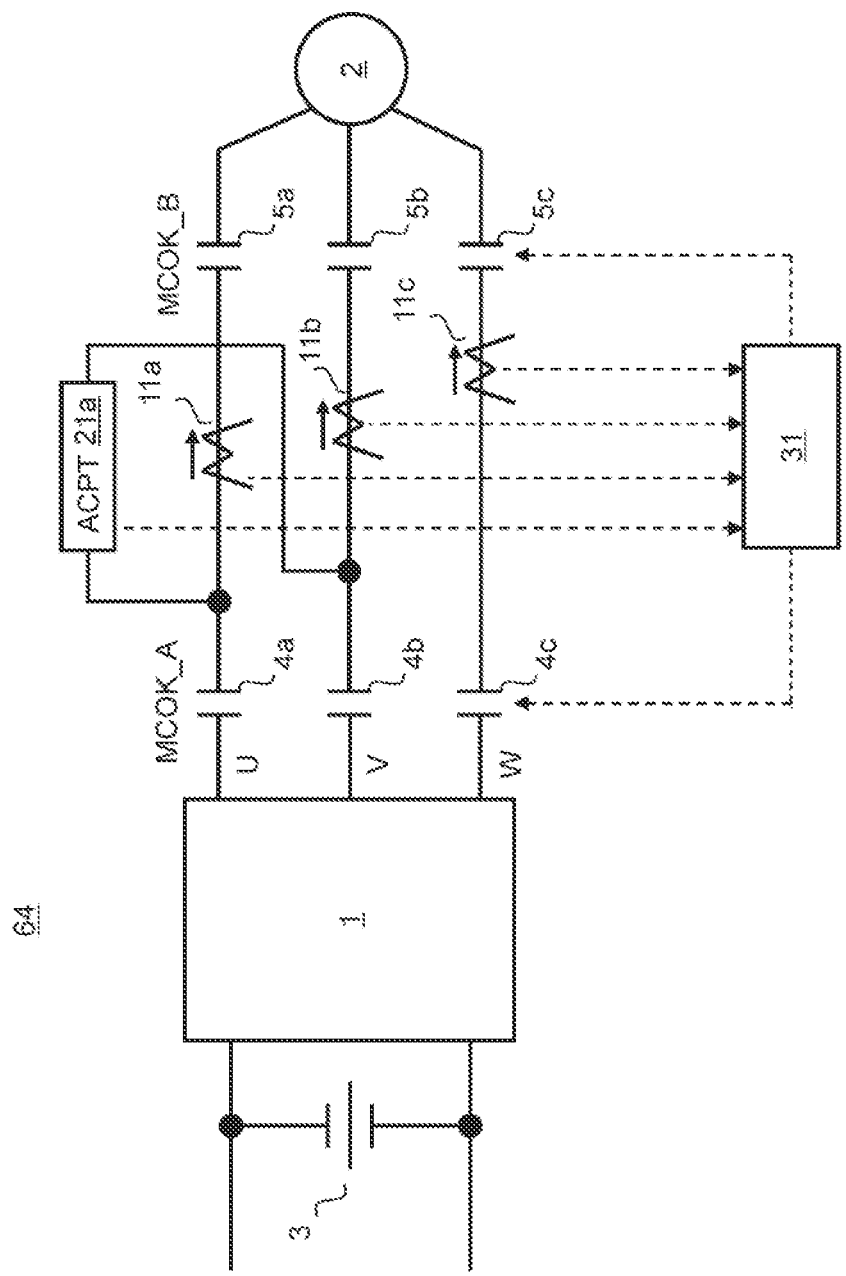
FIG. 7 is a configuration diagram of a present device according to Example 4.

Next, Example 4 of the present invention is described with reference to FIG. 7. FIG. 7 is a configuration diagram of a present device 64 according to Example 3. The present device 64 according to Example 4 illustrated in FIG. 7 is different from the present device 61 according to Example 1 in that second MCOKs_B_5*a* to 5*c* are interposed between the current detectors 11*a* to 11*c* and the AC motor 2 to form series two-stage switches in all three U, V, and W phases.

In a rail vehicle or the like provided with the present device 64 according to Example 4 illustrated in FIG. 7, an effect of continuously operating the vehicle is reliably obtained by blocking the foregoing short circuit current. A description will be given while making comparison with the present devices 61 and 62 according to Example 1 illustrated in FIGS. 1, 2, and 3(*b*). In the present devices 61 and 62, when the ACPT_21*a* has a short circuit failure, a short circuit current flows between the ACPT_21*a* and the AC motor 2 and is detected by the current detectors 11*a* and 11*b* and input to the control device 31.

When the foregoing short circuit current can be blocked, the rail vehicle or the like provided with the present device 64 can be continuously operated. That is, since a plurality of circuits of the same type constitutes drive devices or the like for the rail vehicle, only a failed drive device is disconnected and the vehicle can be continuously operated using the other remaining drive device.

The control device 31 outputs a release instruction to the second MCOKs_B_5*a* to 5*c*. In the present device 64 illustrated in FIG. 7, particularly, the second MCOKs_B_5*a* and 5*b* are released to have a high effect of blocking a short circuit current caused by a short circuit failure of the ACPT_21*a*.

In the present device 64 illustrated in FIG. 7, the measures taken at the time of the failure of the ACPT_21*a* or the like can prevent the short circuit current caused by regenerative power by the ACPT_21*a* and the AC motor 2 (particularly, in the case in which the AC motor is the PMSM_2') from continuously flowing to generate a braking force in the AC motor 2.

Since the two MCOKs are provided in each of the phases as illustrated in FIG. 7, the first MCOKs_A_4 are turned on (closed) after turning on of the second MCOKs_B_5 provided on the AC motor 2 (PMSM_2') side at the time of the activation of the inverter device 1.

More specifically, the second MCOKs_B_5 are turned on first, the ACPT_21*a* detects an inter-phase voltage (voltage between terminals) of the AC motor 2 to estimate the position and speed of a rotor of the motor.

After that, in a state in which the inverter device 1 is activated by the control device 31 based on information of the estimated position and the estimated speed, the first MCOKs_A are turned on. This can prevent an eddy current and an operation such as torque vibration and can start an operation as an inverter in a stable manner.

Example 5

Figure 8:
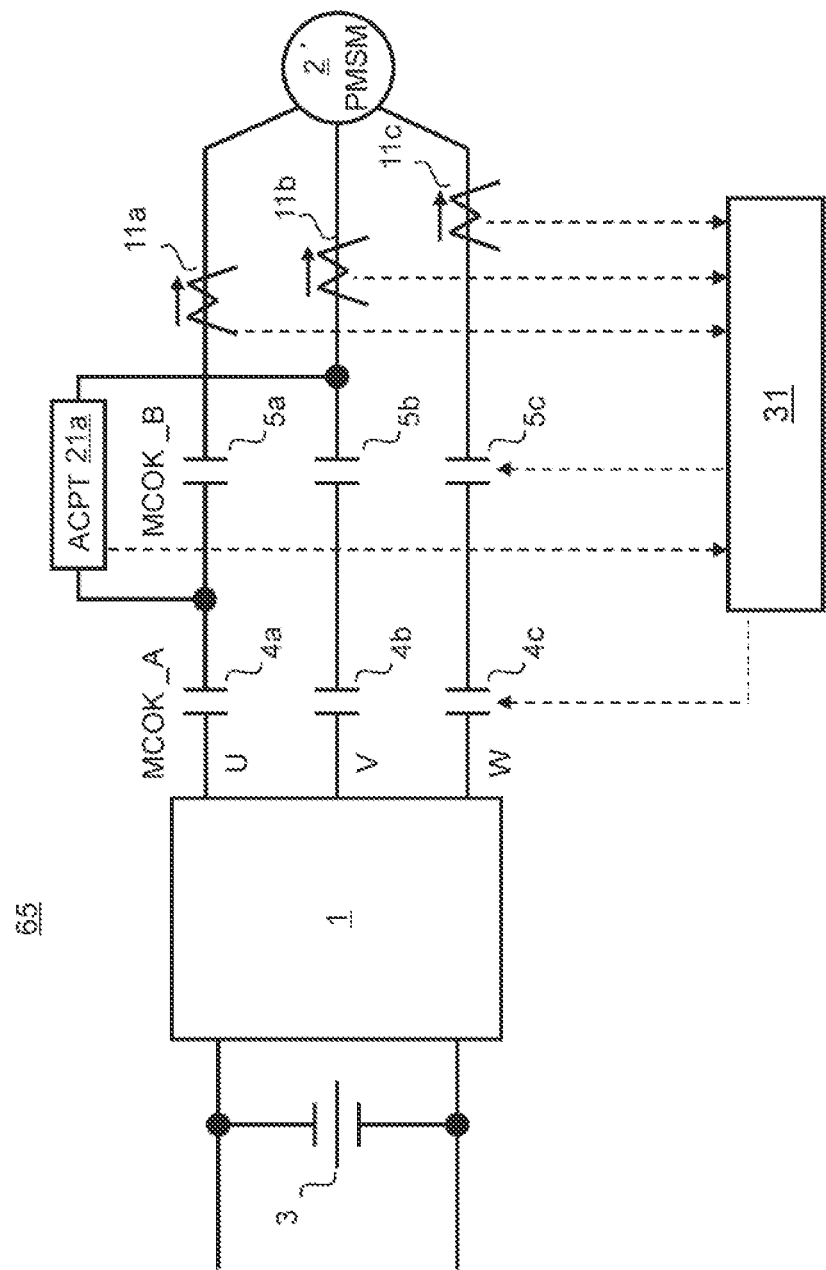
FIG. 8 is a configuration diagram of a present device according to Example 5.

FIG. 8 is a configuration diagram of a present device 65 according to Example 5. The present device 65 according to Example 5 illustrated in FIG. 8 is different from the present device 64 according to Example 4 illustrated in FIG. 7 in the following features. That is, in the present device 65, the current detectors 11*a* to 11*c* are provided on the AC motor 2' side with respect to the second MCOKs_B_5*a* to 5*c*.

In addition, in the present device 65, one (U phase side in FIG. 8) of two phases connected to the ACPT_21*a* is connected between the first MCOK_A_4*a* and the second MCOK_B_5*a*. In addition, in the present device 65, the other phase (V phase in FIG. 8) is connected between the second MCOK_B_5*b* and the current detector 11*b*.

The present device 65 having the foregoing configuration can start an operation as an inverter in a stable manner, like the present device 64 according to Example 4 illustrated in FIG. 7, so that security is improved. That is, the present device 65 can prevent an eddy current and an operation such as torque vibration due to the order of turning on of the first MCOKs_A_4*a* to 4*c* and the second MCOKs_B_5*a* to 5*c*.

As a result, the operation as the inverter can be started in a stable manner. In addition, since the current detectors 11*a* to 11*c* are disposed in the immediate vicinity of the AC motor 2 (2'), the present device 65 can detect a short circuit current caused by a short circuit failure on the AC motor side so that security is improved.

Figure 9:
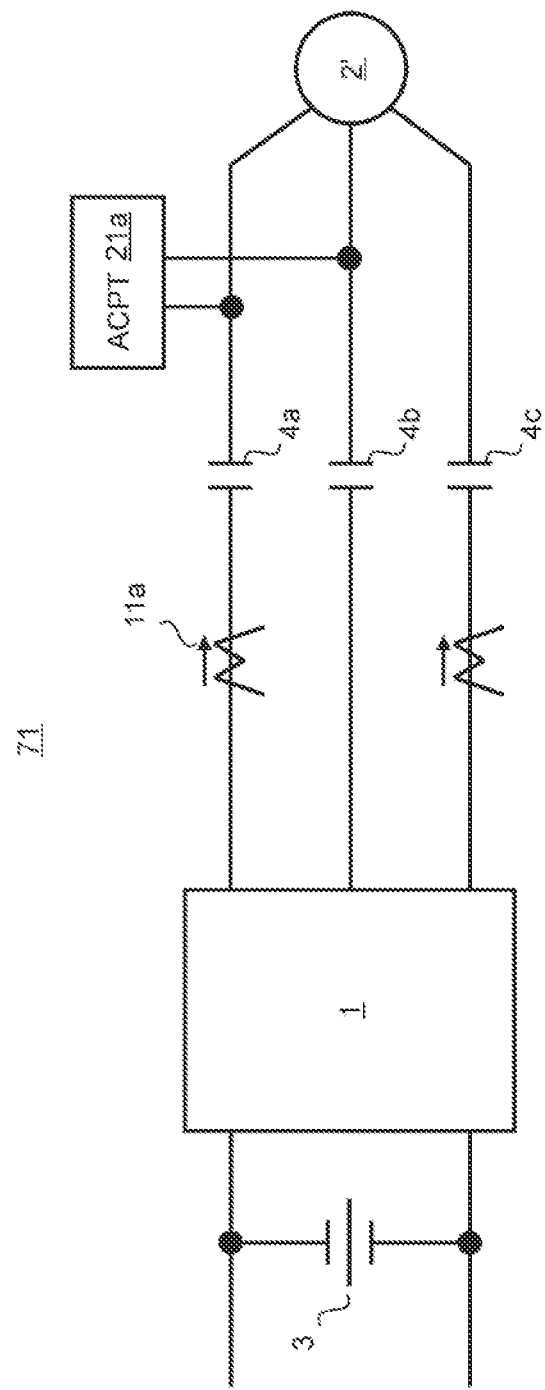
FIG. 9 is a configuration diagram of a three-phase AC motor drive device (comparative device 71) according to Comparative Example 1.
Figure 10:
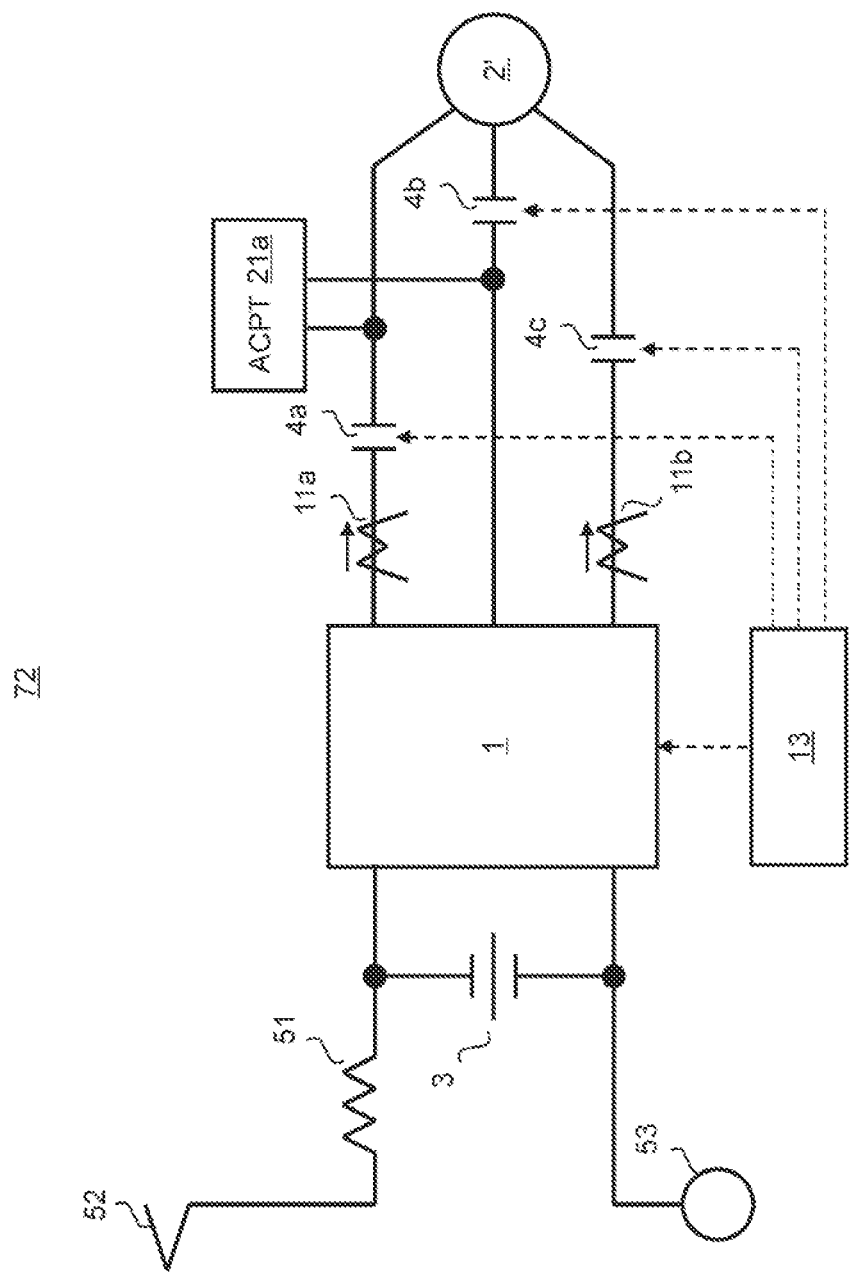
FIG. 10 is a configuration diagram of a comparative device 72.

A defective state in which the permanent magnetic synchronous motor (PMSM_2') performs a regenerative operation at the time of a failure in each of a comparative device 71 illustrated in FIG. 9 and a comparative device 72 illustrated in FIG. 10 is described below. While the AC motor 2 of each of the present devices 61 to 65 illustrated in FIGS. 1 to 8 is an induction motor or the PMSM_2', a motor of each of the comparative devices 71 and 72 illustrated in FIGS. 9 and 10 is limited to the PMSM_2' and is indicated by a reference sign 2' to distinguish them.

Comparative Example 1

FIG. 9 is a configuration diagram of a three-phase AC motor drive device (comparative device 71) according to Comparative Example 1. In the comparative device 71 illustrated as Comparative Example 1 in FIG. 9, current detectors 11*a* and 11*b* and MCOKs_A_4*a* to 4*c* are interposed in different phases on connection lines between an inverter device 1 and the PMSM_2'. In addition, in the comparative device 71, an ACPT_21*a* is disposed between phases.

Regarding the order in which the devices are connected, in a region extending from the inverter device 1 to the PMSM_2', the current detectors 11*a* and 11*b* are interposed and are closer to the inverter device 1 than the MCOKs_A_4*a* to 4*c* are and farther from the PMSM_2' than the MCOKs_A_4*a* to 4*c* are. Therefore, in a state in which the MCOKs_A_4*a* to 4*c* are released, a regenerative current of the PMSM_2' cannot be measured.

The ACPT_21*a* is disposed closer to the PMSM_2' than the MCOKs_A_4*a* to 4*c* are. Therefore, in a state in which the MCOKs_A_4*a* to 4*c* are released, a regenerative voltage of the PMSM_2' can be measured. However, when the ACPT_21*a* has a short circuit failure, it is difficult to disconnect a portion of the failure only by performing an operation from a vehicle cab. As a result, a driver may need to give up continuously operating a rail vehicle with other normal power.

Comparative Example 2

FIG. 10 is a configuration diagram of the comparative device 72. FIG. 10 exemplifies that the comparative device 72 illustrated as Comparative Example 2 is used for a rail vehicle as a general direct-current electric vehicle. When the comparative device 72 is a direct-current electric vehicle, the comparative device 72 has a configuration in which one is connected to a direct-current train line and the other is connected to a portion that is a wheel or the like and contacts the ground. For the direct-current train line, a portion of the smoothing capacitor 3 on the direct-current power supply higher-level side is connected to a smoothing reactor 51 via a pantograph 52 that is a power collector.

In addition, a configuration for obtaining direct-current power by rectifying alternating-current power by an alternating-current overhead contact line or a configuration for obtaining direct-current power by a third rail method is known. Furthermore, a configuration for obtaining alternating-current power by non-contact power transmission and converting the alternating-current power to direct-current power by a rectifier or the like is used.

In the comparative device 72 illustrated in FIG. 10, current detectors 11*a* and 11*b* and MCOKs_A_4*a* and 4*c* are interposed in different phases on connection lines between an inverter device 1 and the PMSM_2', and an ACPT_21*a* is disposed between phases.

The comparative device 72 illustrated in FIG. 10 and the comparative device 71 illustrated in FIG. 9 have a common configuration in which the current detectors 11*a* and 11*b* are disposed between the inverter device 1 and the MCOKs_A_4*a* and 4*c* or the ACPT_21*a*. Therefore, the comparative devices 71 and 72 have a feature in which the current detectors 11*a* and 11*b* cannot measure a regenerative current of the PMSM_2' in a state in which the MCOKs_A_4*a* to 4*c* are released.

On the other hand, the comparative device 72 illustrated in FIG. 10 and the comparative device 71 illustrated in FIG. 9 are different in the following feature. That is, the comparative device 72 has a circuit configuration in which only the one MCOK_A_4*b* among the three MCOKs_A_4*a* to 4*c* is interposed between the ACPT_21*a* and the PMSM_2'. In addition, the current detectors 11*a* and 11*b* are disposed closer to the inverter device 1 than the MCOK_A_4*b* is and farther from the PMSM_2' than the MCOK_A_4*b* is.

With the foregoing circuit configuration, the comparative device 72 illustrated in FIG. 10 cannot measure a regenerative voltage and a regenerative current of the PMSM_2' in a state in which the MCOKs_A_4*a* to 4*c* are released. However, when the ACPT_21*a* has a short circuit failure, it is possible to disconnect a portion of the failure only by performing an operation from the vehicle cab. As a result, it is possible to continuously operate the rail vehicle with other normal power.

The present devices 61 to 65 can be summarized as follows. The present devices 61 and 62 according to Example 1 illustrated in FIGS. 1, 2, and 3(*b*) are representative examples.

[1] Each of the present devices 61 and 62 is a three-phase AC motor drive device that uses the inverter device 1 to drive the three-phase AC motor 2 as a load. The inverter device 1 used in this device has a plurality of current controllers and converts direct-current power supplied from a power supply into alternating-current power for the three U, V, and W phases to drive the load.

Each of the current controllers is a combination of a current control element and a rectifying element. The current control element conducts or blocks a current flowing toward one direction. The rectifying element is connected to the current control element in parallel and conducts a current flowing toward a direction opposite to the one direction.

In each of the present devices 61 and 62, the motor cutout contacts represented by the MCOKs_A_4 are connected between the inverter device 1 and the load and switch whether to electrically connect or disconnect the inverter device 1 to or from the load.

In addition, three-phase current power generated by the inverter device 1 for the U, V, and W phases is supplied to the load. On the other hand, the terminals of the current detector ACPT_21a having the pair of terminals are connected to at least two phases, for example, the U phase and the V phase. To detect a voltage between the U, V, and W phases, it is sufficient if the single ACPT_21a illustrated in FIG. 1 is provided or if the two ACPTs_21a and 21b illustrated in FIG. 2 are provided.

In addition, the current detectors 11 that detect three-phase currents to be supplied from the inverter device 1 to the load are connected to the U, V, and W phases, respectively. The circuit configuration from the inverter device 1 to the load is as follows. That is, the inverter device 1, the load, the MCOKs_A_4, the current detectors 11, and the ACPT_21a are connected such that the inverter device 1 is connected in the immediate vicinity of the MCOKs_A_4, then to the ACPT_21a, then to the current detectors 11, and then to the load.

In each of the present devices 61 and 62 having the foregoing connection configuration, when the ACPT_21a has a short circuit failure (for example, a short circuit between the U and V phases illustrated in FIG. 1), the MCOKs_A_4 are released. This release of the MCOKs_A_4 electrically disconnects the inverter device 1 from the AC motor 2. Even in this state, the current detectors 11a and 11b can detect a short circuit current flowing in a path between the AC motor 2 and the ACPT_21a. This information can be given to the vehicle cab or the like. As a result, a driver or the like can easily take optimal security measures.

The case in which the MCOKs_A_4 are released corresponds to a case in which the load of the present device 61 or 62 is the PMSM_2', the present device 61 or 62 is used in, for example, a rail vehicle, a failure such as a short circuit failure of the ACPT_21a or a reduction in output of the inverter device 1 occurs. In such a case, a driver or the like may take optimal security measures to eliminate a regenerative braking action of the PMSM_2' and continuously operate the vehicle with other remaining power.

The following convenience is obtained by the configurations of the present devices 61 and 62. That is, when the load at the initial design stage is an induction motor, and an MCOK is not required due to a low regenerative braking action, basic design may be made such that an MCOK required due to replacement of the induction motor used as the load with the PMSM_2' when it is not provided in the inverter device 2, and the ACPT_21a are disposed in the immediate vicinity of the inverter device 1 in this order.

That is, to secure a space for the MCOKs and the ACPT_21a, the current detectors 11 are disposed in the immediate vicinity of the load while avoiding the space. In other words, even in the case in which the MCOKs and the ACPT_21s are not required in the inverter device 1 at the initial design stage, when the space is secured and the MCOKs and the ACPT_21a needs to be retrofitted, there is no trouble. That is, it is easy to secure the installation configuration of the inverter device 1 and compatibility of device arrangement, regardless of whether the MCOKs and the ACPT_21a are present.

[2] In each of the present devices 61 and 62 according to Example 1 illustrated in FIGS. 1, 2, and 3(b), the MCOKs_A_4 are preferably connected between connection points between the inverter device 1 and the ACPT_21a. The advantages of the MCOKs_A_4 being disposed in the immediately vicinity of the inverter device 1 are described above.

[3] A connection form of the circuits of the two phases to which the ACPT_21 is connected in the present device 62 according to Example 2 illustrated in FIG. 5 is as follows. In the circuit of one (for example, the U phase) of the two phases, the MCOK_A_4a is connected between the connection point of the ACPT_21a and the current detector 11a. In addition, in the circuit of the other phase (for example, the V phase), the MCOK_A_4b is connected between the inverter device 1 and the connection point of the ACPT_21a.

Regarding the detection of an inter-phase voltage, even when the ACPT_21 fails, a state in which the current detectors 11a to 11c can detect current values of the phases is maintained, and thus the control device 31 illustrated in FIG. 5 easily take corresponding security measures.

[4] In the present device 63 according to Example 3 illustrated in FIG. 6, the MCOK_A_4b is connected as a first motor cutout contact in the V phase between the inverter device 1 and the connection point of the ACPT_21a. In the V phase, the MCOK_B_5b is connected as a second motor cutout contact between the connection point of the ACPT_21a and the current detector 11b.

According to the control device 31 illustrated in FIG. 6, for example, even when a V-phase ground fault accident occurs due to a ground fault of the ACPT_21a, a state in which the current detector 11b can detect a V-phase ground fault current is maintained, and thus it is possible to easily take corresponding security measures.

[5] The present device 64 according to Example 4 illustrated in FIG. 7 includes the MCOKs_B_5 as second motor cutout contacts between the current detectors 11 and the load. According to this, the MCOKs_B_5 as the second motor cutout contacts form series two-stage switches with the MCOKs_A_4 as the first motor cutout contacts.

Even when a regenerative braking state occurs in, for example, a vehicle having the PMSM_2' due to a short circuit failure of the ACPT_21a, the control device 31 illustrated in FIG. 7 maintains a state in which the current detectors 11a and 11b can detect a regenerative current. In this case, when the control device 31 releases the MCOKs_B_5, it is easy to take corresponding security measures.

In addition, when only the second MCOKs_B_5 provided on the PMSM_2' side are turned on (closed) at the time of the activation of the inverter device 1 and the ACPT_21a detects an inter-phase voltage (voltage between terminals) of the PMSM_2, the position and speed of the rotor of the motor are estimated. After that, the first MCOKs_A are turned on based on information of the estimated position and the estimated speed in a state in which the inverter device 1 is activated by the control device 31. This can prevent an eddy current and an operation such as torque vibration and start an operation as an inverter in a stable manner.

[6] The present device 65 according to Example 5 illustrated in FIG. 8 includes the series two-stage switches constituted by the first MCOKs_A_4 and the second MCOKs_B_5 between the inverter device 1 and the current detectors 11a to 11c. In addition, the circuit of the U phase of the two phases connected to the current detector ACPT_21a is connected between the first MCOK_A_4a and the second MCOK_B_5a. Furthermore, the circuit of the other V phase is connected between the second MCOK_B_5b and the current detector 11b.

The present device 65 having the foregoing configuration can start the operation as the inverter at a higher level in a stable manner so that security is improved. That is, the present device 65 can prevent an eddy current and an operation such as torque vibration due to the order of turning on of the first MCOKs_A_4a to 4c and the second MCOKs_B_5a to 5c. In addition, since the current detectors 11a to 11c are disposed in the immediate vicinity of the AC motor 2 in the present device 65, the present device 65 can detect a short circuit current caused by a short circuit failure on the AC motor side so that security is improved.

LIST OF REFERENCE SIGNS

Inverter device, 2 Three-phase AC motor (as load), 2' Permanent magnet synchronous motor (PMSM as load), 4, 4a to 4c First motor cutout contact (MCOK_A), 5, 5a to 5c Second motor cutout contact (MCOK_B), 11, 11a to 11c Current detector, 21a, 21b Voltage detector (ACPT), 31 Control device, 61 to 65 Three-phase AC motor drive device (present device)

The invention claimed is:

1. A three-phase AC motor drive device that drives a load, comprising:
   an inverter device that includes a plurality of current controllers each having a combination of a current control element configured to conduct or block a current flowing toward one direction and a rectifying element connected to the current control element in parallel and configured to conduct a current flowing toward, and is configured to convert direct-current power supplied from a power supply into three-phase alternating-current power and drive the load;
   a motor cutout contact configured to electrically connect or disconnect the inverter device to or from the load;
   a voltage detector configured to detect a voltage between three phases and having terminals connected to circuits of at least two of the phases; and
   a current detector configured to detect phase currents of the three phases, wherein
   in a connection from the inverter device to the load, the connection is in a sequence of the inverter device, the motor cutout contact, the voltage detector, the current detector, and the load; wherein
   in a circuit of one of the two phases connected to the voltage detector, the motor cutout contact is connected to a connection point of the voltage detector and the current detector, and
   in a circuit of the other phase, the motor cutout contact is connected to the inverter device
   and a connection point of the voltage detector.

2. The three-phase AC motor drive device according to claim 1, wherein
   the motor cutout contact is connected between the inverter device and a connection point of the voltage detector.

3. The three-phase AC motor drive device according to claim 1, wherein
   in a phase in which a first motor cutout contact is disposed between the inverter device and a connection point of the voltage detector, a second motor cutout contact is connected to the connection point of the voltage detector and the current detector.

4. The three-phase AC motor drive device according to claim 1, further comprising a second motor cutout contact between the current detector and the load.

5. The three-phase AC motor drive device according to claim 1, further comprising
   a series two-stage switch constituted by a first motor cutout contact and a second motor cutout contact in each of the phases between the inverter device and the current detector, wherein
   a circuit of one of the two phases connected to the voltage detector is connected between the first motor cutout contact and the second motor cutout contact, and a circuit of the other phase is connected between the second motor cutout contact and the current detector.

6. A rail vehicle comprising the three-phase AC motor drive device according to claim 1.

7. A method for driving a three-phase AC motor as a load by an inverter device configured to convert direct-current power supplied from a power supply into three-phase alternating current power, wherein
   the inverter device includes a plurality of current controllers each having a combination of a current control element configured to conduct or block a current flowing toward one direction and a rectifying element connected to the current control element in parallel and configured to conduct a current flowing toward a direction opposite to the one direction, and
   the method comprises:
   detecting an inter-phase voltage between three phases by a voltage detector having terminals connected to circuits of at least two of the phases in a circuit configuration in which the inverter device, a motor cutout contact, the voltage detector, a current detector, and the load are connected in this order in a range from the inverter device to the load;
   detecting phase currents of the three phases by the current detector; and
   electrically connecting or disconnecting the inverter device to or from the load by the motor cutout contact connected between the inverter device and the load based on the detected inter-phase voltage and the detected phase currents; wherein
   in a circuit of one of the two phases connected to the voltage detector, the motor cutout contact is connected to a connection point of the voltage detector and the current detector, and
   in a circuit of the other phase, the motor cutout contact is connected to the inverter device
   and a connection point of the voltage detector.

8. The method for driving the three-phase AC motor according to claim 7, wherein
   the motor cutout contact is connected between the inverter device and a connection point of the voltage detector.

9. The method for driving the three-phase AC motor according to claim 7, wherein
   in a phase in which a first motor cutout contact is disposed between the inverter device and a connection point of the voltage detector, a second motor cutout contact is connected to the connection point of the voltage detector and the current detector.

10. The method for driving the three-phase AC motor according to claim 7, wherein
   a second motor cutout contact is disposed between the current detector and the load.

11. The method for driving the three-phase AC motor according to claim 7, wherein
   a series two-stage switch constituted by a first motor cutout contact and a second motor cutout contact is disposed in each of the phases between the inverter device and the current detector, a circuit of one of the two phases connected to the voltage detector is connected between the first motor cutout contact and the second motor cutout contact, and a circuit of the other phase is connected between the second motor cutout contact and the current detector.

\* \* \* \* \*